(12) United States Patent
Cheng et al.

(10) Patent No.: US 9,399,737 B2
(45) Date of Patent: Jul. 26, 2016

(54) INSULATING AND COOLING CRACKING DEVICE

(71) Applicant: E-Sunscience Co., Ltd., Taipei (TW)

(72) Inventors: Li-Feng Cheng, Taipei (TW); Hsien-Cheng Yu, Taipei (TW)

(73) Assignee: E-SUNSCIENCE CO., LTD., Taipei (TW)

( * ) Notice: Subject to any disclaimer, the term of this patent is extended or adjusted under 35 U.S.C. 154(b) by 537 days.

(21) Appl. No.: 13/909,291

(22) Filed: Jun. 4, 2013

(65) Prior Publication Data

US 2013/0319842 A1 Dec. 5, 2013

Related U.S. Application Data

(60) Provisional application No. 61/655,480, filed on Jun. 5, 2012.

(51) Int. Cl.
*C10B 1/00* (2006.01)
*C10B 39/00* (2006.01)
*C10B 47/06* (2006.01)
*C10B 53/07* (2006.01)

(52) U.S. Cl.
CPC .................. *C10B 39/00* (2013.01); *C10B 47/06* (2013.01); *C10B 53/07* (2013.01); *Y02P 20/129* (2015.11); *Y02P 20/143* (2015.11)

(58) Field of Classification Search
CPC .......... C10B 1/04; C10B 39/00; C10B 47/06; C10B 53/07; F23G 5/0273
USPC .............. 201/10; 202/83, 95, 96, 97, 98, 105, 202/124, 127, 217, 220, 222, 239, 266; 48/119, 123; 110/242; 422/198, 205; 432/77, 81
See application file for complete search history.

(56) References Cited

U.S. PATENT DOCUMENTS 863,718 A * 8/1907 Jewett ........................ C10B 1/04
202/266
3,198,503 A * 8/1965 Eichelberg ............... C21D 1/74
432/81
5,821,396 A * 10/1998 Bouziane ................ C10B 53/07
201/25

* cited by examiner

*Primary Examiner* — Jill Warden
*Assistant Examiner* — Joye L Woodard
(74) *Attorney, Agent, or Firm* — Leong C. Lei

(57) ABSTRACT

An insulating and cooling cracking device includes a thermal cracking furnace accommodated therein. The insulating and cooling device has at least one cooling opening set on its side wall and at least one adiabatic cover. When the thermal cracking device is in heating, the adiabatic cover is closed. When the pyrolysis process is completed, the adiabatic cover is opened to allow the air to flow into one cooling opening. The air further flows through the surface of the thermal cracking furnace, and flows out from another cooling opening to achieve the advantage of more rapid cooling.

11 Claims, 6 Drawing Sheets

INSULATING AND COOLING CRACKING DEVICE

CROSS-REFERENCE TO RELATED APPLICATIONS

This application claims the benefit of the filing date priority of a U.S. Provisional Application No. 61/655,480 filed on Jun. 5, 2012, the disclosure of which is incorporated herein by reference in its entirety.

BACKGROUND

1. Technical Field

The present invention relates to an insulating and cooling cracking device, particularly to an insulating and cooling device providing thermal insulation function when pyrolysis proceeds in a cracking furnace, and also rapidly cooling down the cracking furnace after the pyrolysis process is completed.

2. Related Art

A common method for processing trash or waste is by means of burying or using incinerator, melting furnace, or thermal cracking furnace. However, in recent years, the trash or waste treatment problem has drawn more and more public attention. By the development of technology, the trash or waste caused negative effect to the environment or with poisonous chemicals, such as huge amount of obsolete tires, if not being well-managed in a proper way, will pollute the natural environment and is seriously harmful to the health of the human beings.

A burning temperature of the incinerator is about 800° C.-900° C., which can burn the trash or waste to ashy condition. A burning temperature of the melting furnace is about 1500° C., which can turn the ashes into melting condition. However, these methods cannot recycle useful materials from the trash or waste, and cannot reduce the processing cost and pollutions as well.

Pyrolysis is a method by heating the trash or waste at about 500° C.-800° C. in a non-oxygen or near non-oxygen environment (by using a vacuum pump) to separate and recycle the organic compound. The temperature needed for the pyrolysis is relatively lower than the incinerator and melting furnace. The pyrolysis products of the obsolete tires mainly include liquid oil, carbon black, steel wire, and some flammable mixed gas containing three-phase products. Thus, using pyrolysis to process the trash or waste can obtain fuels and some useful chemical products. In view of forgoing, pyrolysis is a better way to deal with the trash or waste nowadays, because some useful by-products can be obtained after the procedure.

A conventional thermal cracking equipment includes an outer furnace and an inner furnace, and the pyrolysis process is happened in the inner furnace with a closed space. When the pyrolysis process is completed, the temperature of the inner furnace is about 500° C. As mentioned above, carbon black is a pyrolysis product that can be recycled after the pyrolysis process. However, the carbon black should be kept in a low temperature environment, such as 50° C., to prevent from burning with the oxygen of the air. Thus, the thermal cracking equipment should be cooled down to gather the carbon black. However, a cover of the inner furnace in the conventional thermal cracking equipment cannot be directly opened to cool down the temperature, and the thermal cracking equipment can only be cooled down in the environment by itself. Moreover, cooling down by opening the cover of the inner furnace not only will result in self-combustion of the carbon black due to the high temperature, but also cause flying dust, which accompanies with high temperature, that can seriously influence the working environment and damage the worker's health. Since the outer furnace is designed to maintain the temperature, it usually has to take a long period of time, such as 6-8 hours, or even 24 hours, to cool down the outer furnace to a desired low temperature, such as 50° C.

The critical issue for today's industrial thermal cracking process lies in that: when the pyrolysis process is completed, the cooling time for the inner furnace is long, which seriously influences the product yield rate. Therefore, an improved thermal cracking furnace structure is necessary to speed up the cooling rate of the thermal cracking furnace, and able to quickly recycle the by-products such as the carbon black, thereby noticeably shortening the processing time.

BRIEF SUMMARY

The present invention provides an insulating and cooling cracking device, which has both excellent insulating and quick cooling effects.

The present invention also provides an insulating and cooling cracking device with even thermal conduction which results in uniform temperature during pyrolysis process.

An insulating and cooling cracking device according to the present invention includes: an insulating and cooling device having a first cooling opening and a second cooling opening; a thermal cracking furnace accommodated in the insulating and cooling device, a space being provided between the thermal cracking furnace and the insulating and cooling device, the space defining an air flowing channel, wherein the air flowing channel connects to the first cooling opening and the second cooling opening; a first adiabatic cover and a second adiabatic cover covering the first cooling opening and the second cooling opening during the pyrolysis process to provide insulating function. When the pyrolysis process is completed, the adiabatic covers can be opened to perform the furnace cooling process. The outside air flows into the insulating and cooling device from one of the cooling openings and further flows through the surface of the thermal cracking furnace, and finally flows out from the other cooling opening to achieve more rapid cooling For the thermal cracking furnace according to the present invention, the first adiabatic cover and the second adiabatic cover can be shown in varies types, such as a detachable adiabatic cover which can be totally separated from the insulating and cooling device, or an adiabatic cover which can be directly pivotably coupled to the insulating and cooling device, or even an adiabatic cover able to slide on the insulating and cooling device.

The cooling opening area of the thermal cracking furnace according to the present invention is preferably above 5% of the side wall where the cooling opening is arranged, or even more, the area of the cooling opening can also be designed to match the size of the side wall. Besides, a height difference along an axial direction of the insulating and cooling device exists between the first cooling opening and the second cooling opening, which means the first cooling opening and the second cooling opening are not located in the same horizontal level, thereby speeding up the cooling effect.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
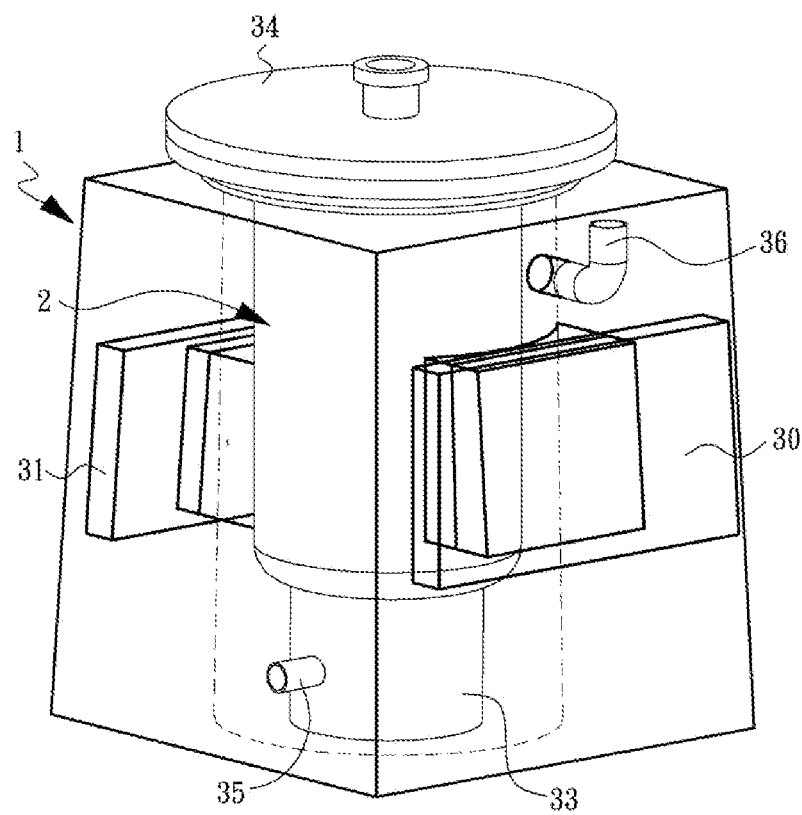
FIG. 1 is an assembling perspective view of a first embodiment of an insulating and cooling device according to the present invention.

Referring to FIG. 1, an insulating and cooling cracking device according to the present invention includes an insulating and cooling device 1, a thermal cracking furnace 2, a first adiabatic cover 30, a second adiabatic cover 31, a base 33, a top cover 34, a heating hole 35, and an exhaust vent 36. A closed space is provided between the insulting and cooling device 1 and the thermal cracking furnace 2. When heated air enters from the heating hole 35 to the closed space, the heated air flows upward along the outer surface of the thermal cracking furnace 2, quickly and evenly heating the thermal cracking furnace 2. Finally, waste air exhausts from the exhaust vent 36 to a waste gas pipe.

Figure 2:
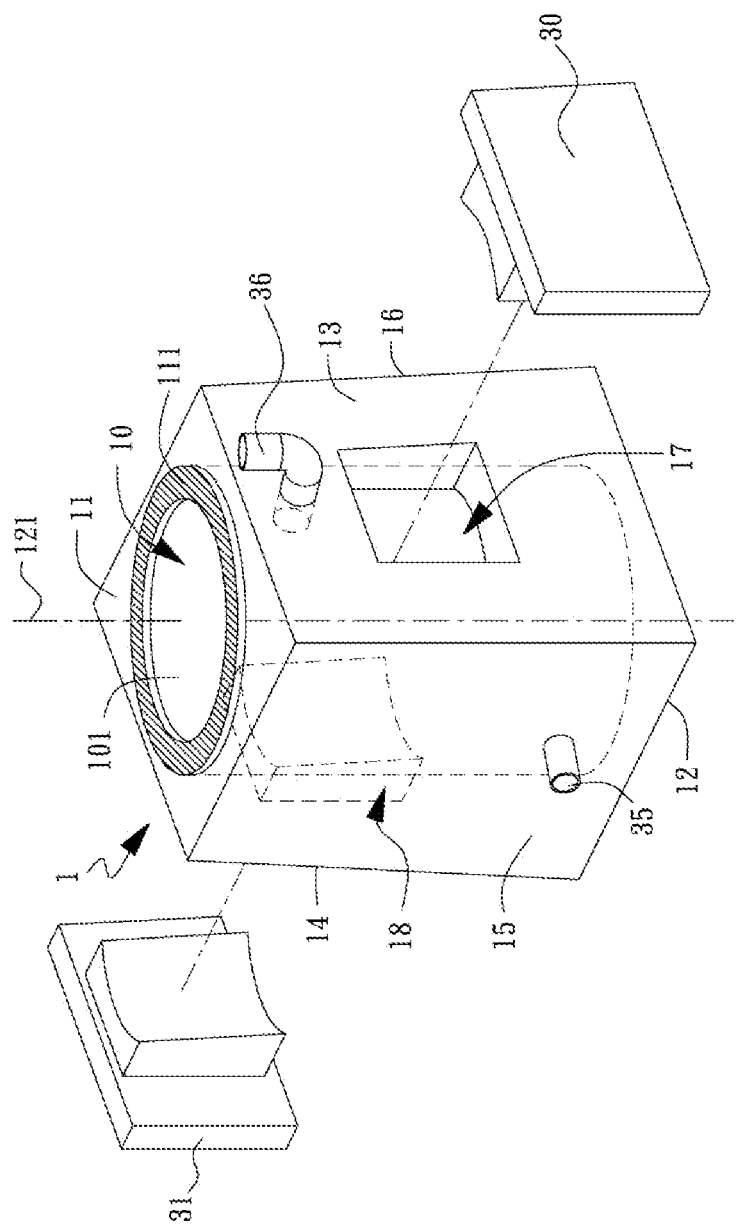
FIG. 2 is an exploded perspective view of the first embodiment of the insulating and cooling device according to the present invention.

As shown in FIG. 2, the insulating and cooling device 1 is a hollow cube, which includes a top portion 11, a bottom portion 12, a front side wall 13, a back side wall 14, a left side wall 15, and a right side wall 16. The insulating and cooling device 1 has a metal case providing a hollow chamber 10 to accommodate the thermal cracking furnace 2. A heating hole 35 is provided at a lower portion of the left side wall 15, and the exhaust vent 36 is provided at an upper portion of the front side wall 13. The top portion 11 of the insulating and cooling device 1 is provided with an installation port 101 connecting to the hollow chamber 10 to allow the thermal cracking furnace 2 to be installed into the insulating and cooling device 1. The insulating and cooling device 1 according to the preferable embodiment of the present invention is a hollow cube, but not limited thereto. The positions of the heating hole 35 and the exhaust vent 36 are not limited to the left side wall 15 and the front side wall 13, respectively; any similar insulating and cooling devices with the same invention spirit are all in the same field of the present invention.

In the preferable embodiment according to the present invention, the opposite sides, i.e. the front side wall 13 and the back side wall 14, of the insulating and cooling device 1 are provided with a first cooling opening 17 and a second cooling opening 18, respectively, and both the first cooling opening 17 and the second cooling opening 18 directly penetrate the insulating and cooling device 1 to connect the hollow chamber 10. In the present embodiment, the first cooling opening 17 and the second cooling opening 18 are approximately provided on the same height along the direction of the central axis 121.

Figure 3:
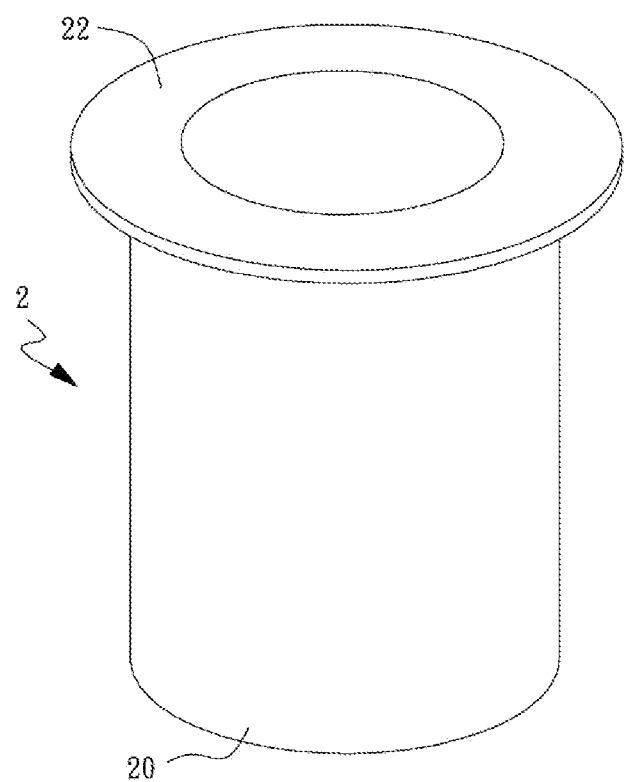
FIG. 3 is a schematic diagram of the first embodiment of a thermal cracking furnace according to the present invention.

After the thermal cracking furnace 2 is installed in the insulating and cooling device 1, the insulating and cooling device 1 is provided with thermal insulation function and capable of maintaining the temperature. A layer of heat insulating material 111 covers inner surfaces of the insulating and cooling device 1, and thus the heat can be sealed inside the device 1. When the thermal cracking furnace 2 is heated, the first cooling opening 17 is covered by the first adiabatic cover 30, and the second cooling opening 18 is covered by the second adiabatic cover 31. The first and second adiabatic covers 30, 31 also have the insulating function as the insulating and cooling device 1, thereby sealing the heat inside the device 1. As shown in FIG. 3, the thermal cracking furnace 2 has a main body 20 approximately formed in a tubular structure, but not limited thereto. The main body 20 can be also formed in other shapes, as long as the main body 20 can be accommodated in the hollow chamber 10 of the insulating and cooling device 1, and is spaced from the insulating and cooling device 1.

When the thermal cracking furnace 2 is assembled and positioned into the insulating and cooling device 1, a head portion 22 of the thermal cracking furnace 2 is supported and in contact with the top portion 11 and is covered with a top cover 34. By this arrangement, a closed space is formed between the thermal cracking furnace 2 and the insulating and cooling device 1. The other end of the thermal cracking furnace 2, opposite to the head portion 22, is supported on a base 33 which is provided within the insulating and cooling device 1 and near the bottom portion 12 of the insulating and cooling device 1. The base 33 is preferably a firebrick. The aforementioned closed space formed between the thermal cracking furnace 2 and the insulating and cooling device 1 is connected to the first cooling opening 17 and the second cooling opening 18.

Figure 4:
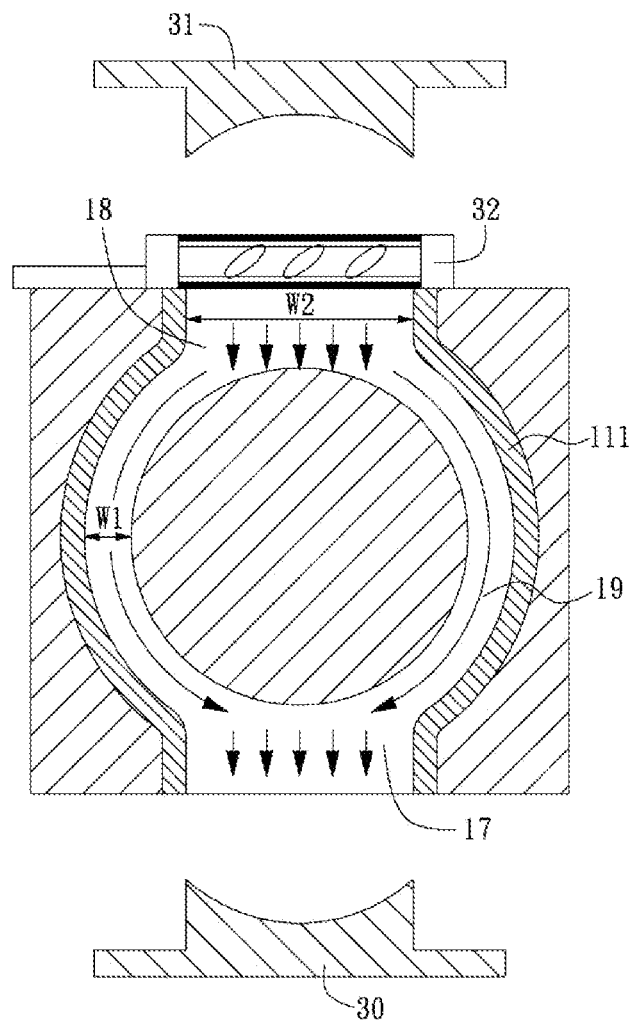
FIG. 4 is a top view of the first embodiment of the insulating and cooling device according to the present invention.

As shown in FIG. 4, from a top view, an air flowing channel 19, in the form of a closed space, is formed between the exterior wall of the thermal cracking furnace 2 and the insulation material 111 formed on the interior wall of the insulating and cooling device 1, thereby reducing the turbulent flow and speeding up the air flowing rate to quickly cool down the thermal cracking furnace 2. When the adiabatic covers 30, 31 are opened, the aforementioned closed space can exchange heat with the outer environment, and the air flowing channel 19 allows the cool air from the outer environment to flow through the outer surface of the thermal cracking furnace 2. The first cooling opening 17 and the second cooling opening 18 are in opposite positions. A width of the air flowing channel 19 is W1, and the width of the second cooling opening 18 is W2. The ratio of the W1 to W2 is preferably 1:8. When the air flow meets irregular edges and corners, irregular distribution of the air flow will be caused, which is so called turbulence. Therefore, by utilizing the air flowing channel 19 to guide the air flow, the way that the air flows through will be smooth and unobstructed, and the turbulence can be minimized as well. In the other preferred embodiment, a cooling fan 32 can be installed on one of the cooling openings. When in a stuffy environment, the cooling fan can be turned on to force heat exchange between the thermal cracking furnace 2 and the outer environment to speed up the cooling down process. In another preferred embodiment, an extraction/blowing device can be fixed to the insulating and cooling device 1 to achieve heat exchange between the thermal cracking furnace 2 and the outer air. The air used in the present embodiment can be ordinary ambient air or cooled air, or any kinds of air with temperature lower than that of the thermal cracking furnace 2 after the pyrolysis process. Besides, a heat pump can also be installed on the other cooling opening to recycle the heat generated during the pyrolysis process.

On the other hand, when the pyrolysis process is completed, for cooling down the thermal cracking furnace 2 to collect the carbon black, the first cooling opening 17 and the second cooling opening 18 can be opened by removing the first adiabatic cover 30 and the second adiabatic cover 31 from the corresponding openings. By doing so, the outer air can flow into one of the cooling openings 17 or 18 and flows out from the other cooling opening 17 or 18. Such configuration can minimize the turbulence and increase the air flowing speed to quickly cool down the thermal cracking furnace 2.

Preferably, the cooling fan 32 can also be installed on the first cooling opening 17, and can draw the outer air and blow the outer air to the thermal cracking furnace 2 to speed up the whole cooling process. Preferably, a heat pump can also be installed to recycle the heat and turns the heat into electricity power.

The present invention would be more valuable if being used in mobile pyrolysis system. By using the limited space in a container car, a whole pyrolysis system including the equipment for pyrolysis process, condensation, feeding, oil storage, waste air processing, electricity generation, and carbon black recycle can be achieved. The insulating and cooling cracking device 1 according to the present invention uses low temperature pyrolysis technique to prevent high temperature which might damage the steel structure of the container car. The mobile pyrolysis system can directly move to the raw material area to process the garbage, and turn the pyrolysis product into electricity. Moreover, when the container car moves to next places, the insulating and cooling cracking device 1 can also utilize the flowing air generated by the moving vehicle to cool down the thermal cracking furnace 2, thereby saving precious time.

As to the cooling method of the thermal cracking furnace 2, besides the installation of the additional cooling fan 32 to force air induction, the thermal cracking furnace 2 can also use another nature cooling method, for example, connecting an external air duct from the first cooling opening 17 to the environment having strong wind, so the natural wind can flow along the air duct to the hollow chamber 10 to cool down the thermal cracking furnace.

In the present invention, the area for each of the first cooling opening 17 and the second cooling opening 18 is preferably at least 5% of the corresponding side wall area of the insulating and cooling device 1. In one embodiment, the cooling openings 17, 18 can also be as large as the whole side walls. Besides, both of the cooling openings 17, 18 can have the same size or different sizes, and shapes of the cooling openings 17, 18 are not restricted.

Figure 5:
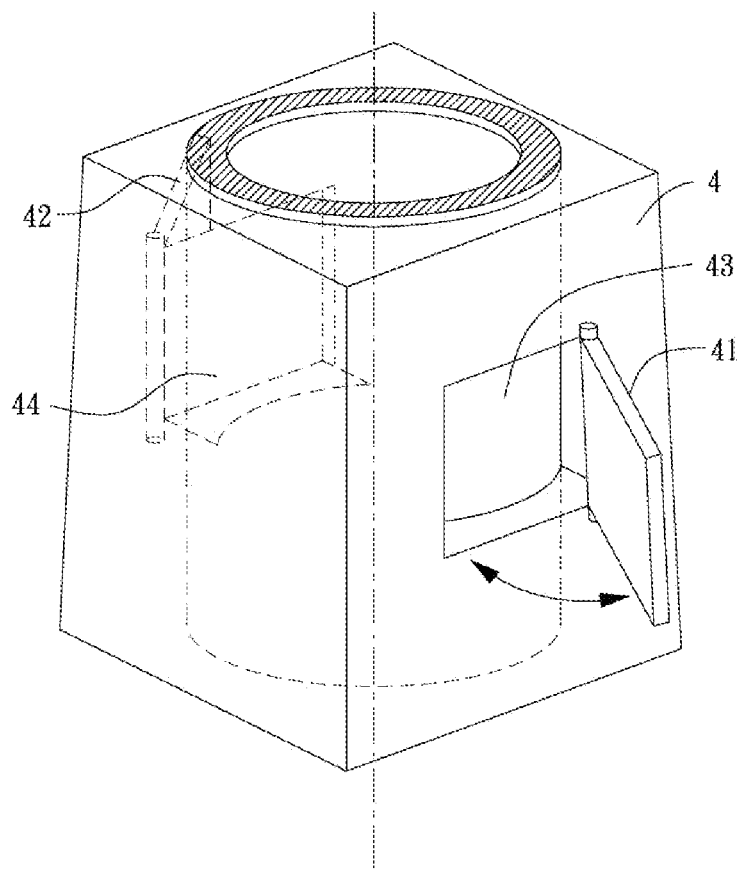
FIG. 5 is a schematic diagram of a second embodiment of the insulating and cooling device according to the present invention.

Although the two adiabatic covers 30, 31 in the first embodiment are installed individually. Please refer to FIG. 5. In the second preferable embodiment, a first adiabatic cover 41 and a second adiabatic cover 42 can be pivotably coupled to an insulating and cooling device 4. The first adiabatic cover 41 and the second adiabatic cover 42 rotatably cover a first cooling opening 43 and a second cooling opening 44. Additionally, other embodiments may include sliding type adiabatic covers or middle-pivot type adiabatic covers.

Figure 6:
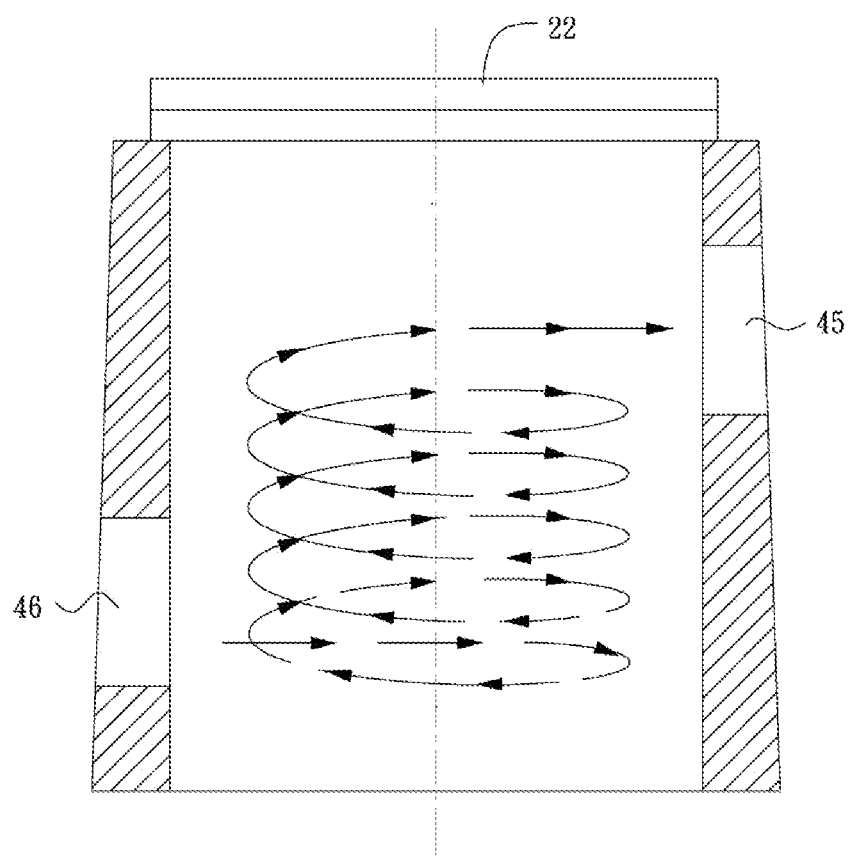
FIG. 6 is a sectional view of a third embodiment of the insulating and cooling device according to the present invention.

Please refer to FIG. 6. In the third preferable embodiment, the first cooling opening 45 and the second cooling opening 46 are designed to be located at different heights along the direction of a central axis of an insulating and cooling device 5. The position of the first cooling opening 45 is higher than the second cooling opening 46 along the axial direction. The advantage of this arrangement lies in that, cool air flows into the second cooling opening 46 and is heated in a closed space, and then the heated air flows upward to the outside from the first cooling opening 45, thereby achieving excellent cooling speed.

In other embodiments, the first cooling opening and the second cooling opening are not restricted to be arranged on the opposite sides. For example, when the first cooling opening 17 is arranged on the front side wall 13 as shown in FIG. 1, the second cooling opening 18 can be arranged on one of the side walls 15 and 16.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An insulating and cooling cracking device, comprising:
   an insulating and cooling device including a first cooling opening and a second cooling opening;
   a thermal cracking furnace accommodated in the insulating and cooling device, a space being provided between the thermal cracking furnace and an interior of the insulating and cooling device, the space defining an air flowing channel, wherein the air flowing channel connects to the first cooling opening and the second cooling opening;
   a first adiabatic cover selectively covering the first cooling opening;
   a second adiabatic cover selectively covering the second opening; and
   a cooling fan fixed to the insulating and cooling device, the cooling fan being arranged on the first cooling opening.

2. The insulating and cooling cracking device according to claim 1, wherein the first cooling opening and the second cooling opening are provided on opposite side walls of the insulating and cooling device, respectively.

3. The insulating and cooling device according to claim 2, wherein the first cooling opening faces directly opposite to the second cooling opening.

4. The insulating and cooling cracking device according to claim 2, wherein a height difference along an axial direction of the insulating and cooling device exists between the first cooling opening and the second cooling opening.

5. The insulating and cooling cracking device according to claim 1, wherein the adiabatic covers are individual plates independent to the insulating and cooling device.

6. The insulating and cooling cracking device according to claim 1, wherein the adiabatic covers are pivotably coupled to the insulating and cooling device.

7. The insulating and cooling cracking device according to claim 1, wherein areas of the first cooling opening and the second cooling opening are at least 5% of the side wall areas of the insulating and cooling device.

8. The insulating and cooling cracking device according to claim 1, wherein the insulating and cooling device is a hollow cube.

9. The insulating and cooling cracking device according to claim 1, wherein the insulating and cooling device is a hollow metal case.

10. The insulating and cooling cracking device according to claim 1, wherein a width of the air flowing channel is smaller than a width of the cooling opening.

11. The insulating and cooling cracking device according to claim 10, wherein a width ratio of the air flowing channel to the cooling opening is 1:8.

* * * * *